(12) United States Patent
Fink et al.

(10) Patent No.: US 6,508,439 B1
(45) Date of Patent: Jan. 21, 2003

(54) FLAP ACTUATOR SYSTEM

(75) Inventors: David Allan Fink, Melrose, MA (US); Marcel Pierre Joseph Gaudreau, Lexington, MA (US); Stephen Mark Carson, Winthrop, MA (US)

(73) Assignee: Diversified Technologies, Inc., Bedford, MA (US)

( * ) Notice: Subject to any disclaimer, the term of this patent is extended or adjusted under 35 U.S.C. 154(b) by 0 days.

(21) Appl. No.: 09/562,155

(22) Filed: May 1, 2000

Related U.S. Application Data
(60) Provisional application No. 60/134,636, filed on May 18, 1999.

(51) Int. Cl.[7] ..................... B64C 11/16; B64C 27/615
(52) U.S. Cl. ................................. 244/215; 416/23
(58) Field of Search ................. 244/17.25, 39, 244/215; 416/23, 24

(56) References Cited

U.S. PATENT DOCUMENTS

| | | | | |
|---|---|---|---|---|
| 3,451,644 A | * | 6/1969 | Marchetti et al. | 244/7 A |
| 3,883,093 A | * | 5/1975 | Violleau | 244/215 |
| 5,566,910 A | * | 10/1996 | Diekmann et al. | 244/215 X |
| 5,686,907 A | * | 11/1997 | Bedell et al. | 244/215 X |

* cited by examiner

Primary Examiner—Robert P. Swiatek
(74) Attorney, Agent, or Firm—Iandiorio & Teska (57) ABSTRACT

A flap actuator system for an airfoil structure including a flap member for controlling the airfoil structure; a bearing member interconnected with the flap member and airfoil structure; and an electromagnetic motor segment integral with the flap member and airfoil structure for rotating the flap member about the axis of the bearing member relative to the airfoil structure and including a field circuit integral with one of the flap member and airfoil structure and an armature circuit integral with the other; the bearing member may be a tension member which is attached to the airfoil structure at a first point and to the flap member at a second point spaced from the first point.

33 Claims, 8 Drawing Sheets

FLAP ACTUATOR SYSTEM

RELATED APPLICATIONS

This application claims the benefit of U.S. Provisional Application No. 60/134,636 filed May 18, 1999.

GOVERNMENT RIGHTS

This invention was made with U.S. Government support under Contract No. DAAHJ02-97-C-0020 awarded as an SBIR-II grant by the U.S. Army. The Government may have certain rights in the subject invention.

FIELD OF THE INVENTION

This invention relates to a flap actuator system for an airfoil structure.

BACKGROUND OF THE INVENTION

During steady, level, forward flight in a helicopter, the air velocity vector relative to the blade varies with blade azimuthal position in a complex, yet predictable, manner. In general, the result is a varying lift pattern that is periodic with a multiple of rotor rotation rate. The intensity and time dependence of this force is related to the forward velocity of the helicopter, wind conditions, blade instantaneous angle of attack, blade dynamics and aeroelastic properties, and rotor speed. These lift variations bend the blades up and down every revolution and produce a harmonic series of vibrations and noise synchronized to the blade rotation rate. When a helicopter is descending or leaning into a turn, additional noise and vibration are generated by even more complex lift variations caused by blades flying through wakes and trailing vortices of other blades. Other complex excitation sources include atmospheric turbulence, fuselage interference, and mismatches in airfoil aerodynamic and/or aeromechanical properties.

To compensate or minimize these time dependent forces, helicopters and vertical lift aircraft have controlled surfaces or variable angle-of-attack blades. A controlled surface flaps up and down to produce a twist moment or change the instantaneous lift of the blade or wing. The control surface could consist of the entire blade or a flap on the trailing edge of a blade or wing. A change in lift caused by the actuation of a flap acts as a canceling force, neutralizing vibrations produced by the unequal lift on different blades.

In this prior art, most helicopters vary the angle of attack of the blade at 1/rev by means of a conventional swash plate to minimize the 1/rev blade harmonic. Other production helicopters use a blade-mounted trailing flap modulated at 1/rev for this purpose. The upper harmonics and non-synchronized lift variations are not, in general minimized due to the mechanical complexity of such high frequency actuation.

For rotor blade mounted flaps, several techniques are known for actuation of a flap. Kaman actuates a servo flap via a long rod, which twists a blade once per revolution. Others have used a cable to pull a mechanism to move the flap. These mechanical methods are generally reliable, but are unsuitable for higher harmonic blade control. They suffer from slow response, backlash, and programming inflexibility should desired flap schedule or harmonic content requirements change. Hydraulic systems are capable of generating large force and considerable stroke. However, they are heavy, usually limited in frequency response, and less reliable at the high repetition rate required of the actuator.

Piezoelectric or "smart material" devices, used in research for a decade, offer fast response and light weight. As a voltage is applied to the piezoelectric crystal, it swells a few thousandths of an inch. The swelling drives a leveraged system that amplifies its stroke. Smart material actuators suffer from low torque and power capability, and generally, small strokes. Though amplifying the strokes mechanically increases flap deflection angle, this is offset by torque reduction, weight increase, introduction of backlash, and inherent reduced reliability. Piezoelectric actuator research continues, further improvements are possible, but the drawbacks mentioned above still appear to represent a serious roadblock to their practical implementation in production helicopters.

SUMMARY OF THE INVENTION

It is therefore an object of this invention to provide an improved flap actuator system for controlling an airfoil structure.

It is a further object of this invention to provide an improved flap actuator system which is electrically operated, simple and rugged.

It is a further object of this invention to provide an improved flap actuator system which is powerful, robust and lightweight.

It is a further object of this invention to provide an improved flap actuator system which reduces vibration and noise.

It is a further object of this invention to provide an improved flap actuator system which improves lift.

It is a further object of this invention to provide an improved flap actuator system which is capable of operating quickly and at high g loads.

It is a further object of this invention to provide an improved flap actuator system which can be located at significant radial distances on a rotating blade where small movements produce substantial aerodynamic forces.

The invention results from the realization that a truly simple and effective flap actuator system capable of operating quickly and in high g environments can be achieved by employing an electromagnetic motor whose armature and field are made integral with the flap member and airfoil structure so that they themselves become part of the motor or motor segment, and the further realization that an intermediate drive mechanism could also be used between the motor and flap so that the motor is integral with the airfoil structure and drive mechanism, and the further realization that the flap can be suspended from the airfoil structure by a tension member.

This invention features a flap actuator system for an airfoil structure subject to high g forces including a flap member for controlling the airfoil structure and a tension member having its axis extending along the g force axis. The tension member is attached to the airfoil structure at a first point and to the flap member at a second point spaced from the first point in the direction of the g force axis. An actuator device rotates the flap member about the axis of the tension member relative to the airfoil structure.

In a preferred embodiment the tension member may include a tension bar and/or may include a torsion bar. The foil structure may be a rotary blade. The rotary blade may be a helicopter blade. The second point may be at the radially outward end of the flap member. The tension member may be attached at the first and second points with a low stress fastener device. The fastener device may include a dowel pin fastener. The actuator device may include an electromagnetic driver. The actuator device may also include a drive mechanism interconnecting the electromagnetic driver and the flap member. The flap member and the airfoil structure may be integral. The flap member may be made out of aluminum or a composite.

The invention also features a flap actuator system for an airfoil structure including a flap member for controlling the airfoil structure and a bearing member interconnected with the flap member and airfoil structure. An electromagnetic motor segment integral with the flap member and airfoil structure rotates the flap member about the axis of the bearing member relative to the airfoil structure. The electromagnetic motor segment may include a field circuit integral with one of the flap member and airfoil structure and an armature circuit integral with the other.

In a preferred embodiment the flap member and airfoil structure may be integral. The bearing member may include a tension bar and/or a torsion bar. The field circuit may be in the flap member and the armature circuit in the airfoil structure. The field circuit may include a permanent magnet device. The armature may include a coil circuit. The permanent magnet device may include a plurality of permanent magnets. The coil circuit may include more than one electromagnetic coil. Each electromagnetic coil may include a ribbon winding and may include a support core. The flap member may include at least one pocket for mounting the permanent magnet device. The flap member and airfoil structure may be integral.

The invention also features a flap actuator system for an airfoil structure including a flap member for controlling the airfoil structure and a bearing member interconnected with the flap member and the airfoil structure. An actuator device rotates the flap member about the bearing member relative to the airfoil structure. The actuator device includes an electromagnetic motor segment and a drive mechanism driven by the electromagnetic motor to rotate the flap member about the axis of the bearing member relative to the airfoil structure. The electromagnetic motor segment is integral with the airfoil structure and the drive mechanism. The electromagnetic motor includes a field circuit integral with one of the flap member and drive mechanism and an armature circuit integral with the other.

In a preferred embodiment the drive mechanism may include a gear drive, a pulley drive, a crossband drive, a slider drive, a flex drive, or a rigid link.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
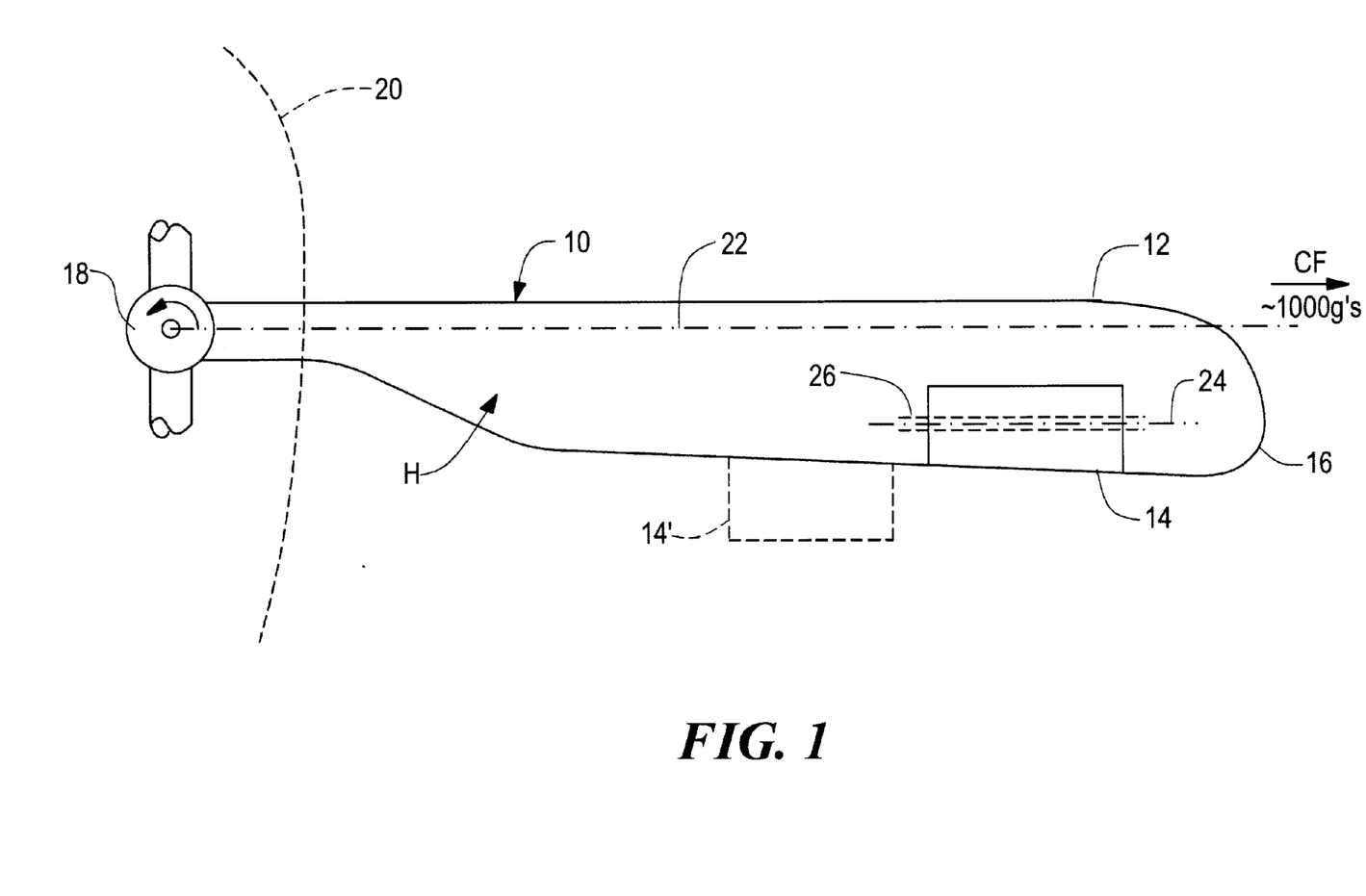
FIG. 1 is a top plan schematic diagram of a helicopter rotor showing one blade and the flap according to this invention.

There is shown in FIG. 1 a helicopter blade 10 having a flap system 12 according to this invention including flap member 14 mounted toward the outer end 16 of blade 10 on the trailing edge, although it should be understood that the flap can be placed anywhere along the blade on either the trailing or the leading edge and may in fact be attached at the trailing edge for example, as shown in dashed lines at 14' or be at the leading edge as at 14". Further there may be a plurality of flaps Blade 10 is one of a number of blades attached to the hub 18 of a helicopter 20. The force radially outwardly along radius 22 caused by a centrifugal force can reach magnitudes in the neighborhood of 1000 g's. Flap 14, inasmuch as it is at the distal end of blade 10, will experience these high g forces. Flap 14 in accordance with this invention is made to rotate or deform about the longitudinal axis 24 of a bearing member 26. Although flap system 12 and flap 14 are shown in a helicopter blade application, this is not a necessary limitation of the invention as it may be employed anywhere where it is required to have a flap affect the lift or other aerodynamic qualities of a blade or an airfoil such as turbine or compressor blade, airplane wing or missile control surface. Flap system 12 can be configured as a primary system or a servo system.

Figure 2:
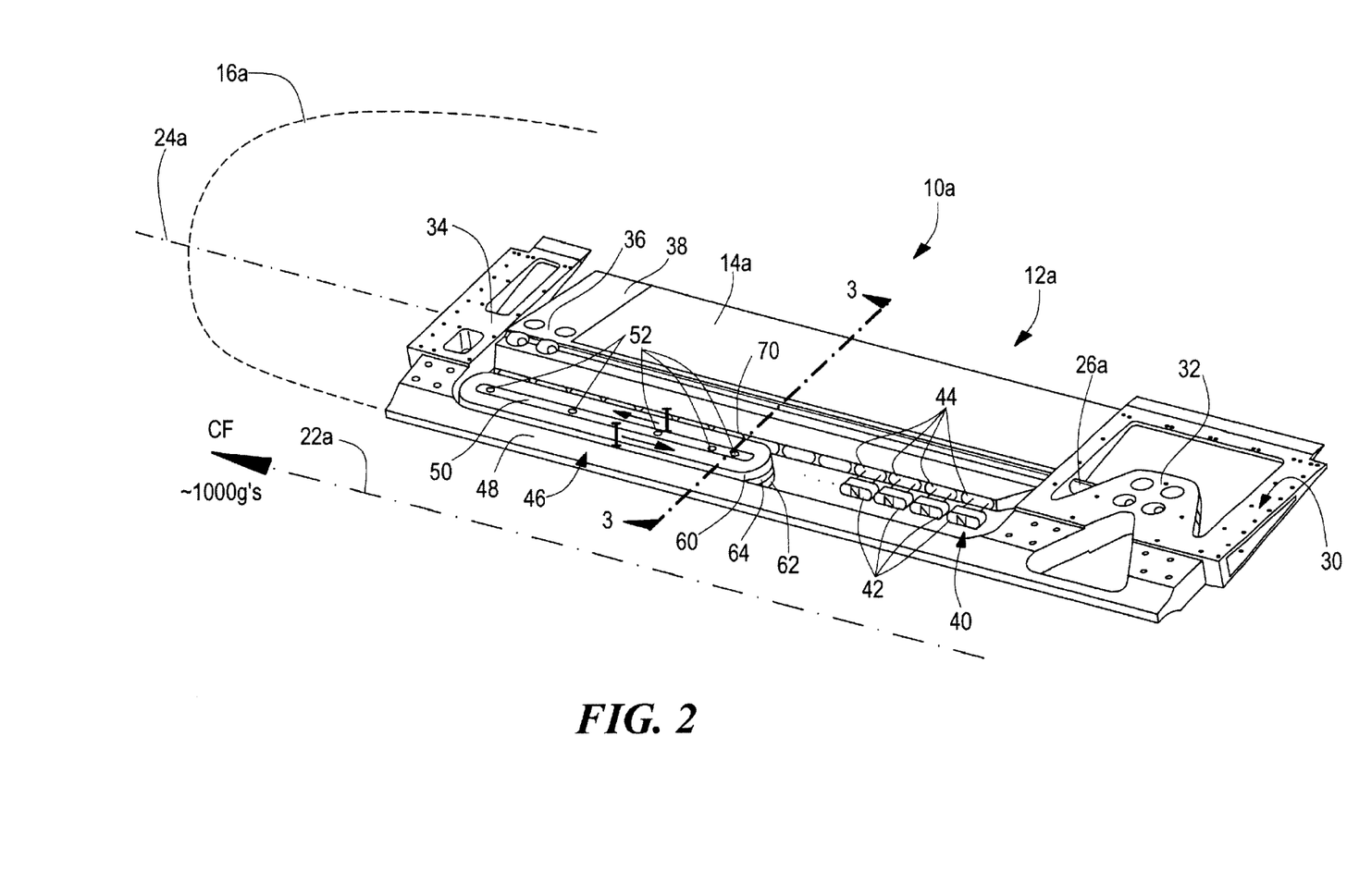
FIG. 2 is a more detailed three-dimensional view with parts broken away of a section of the blade of FIG. 1 showing a more detailed view of the flap system according to this invention.
Figure 3:
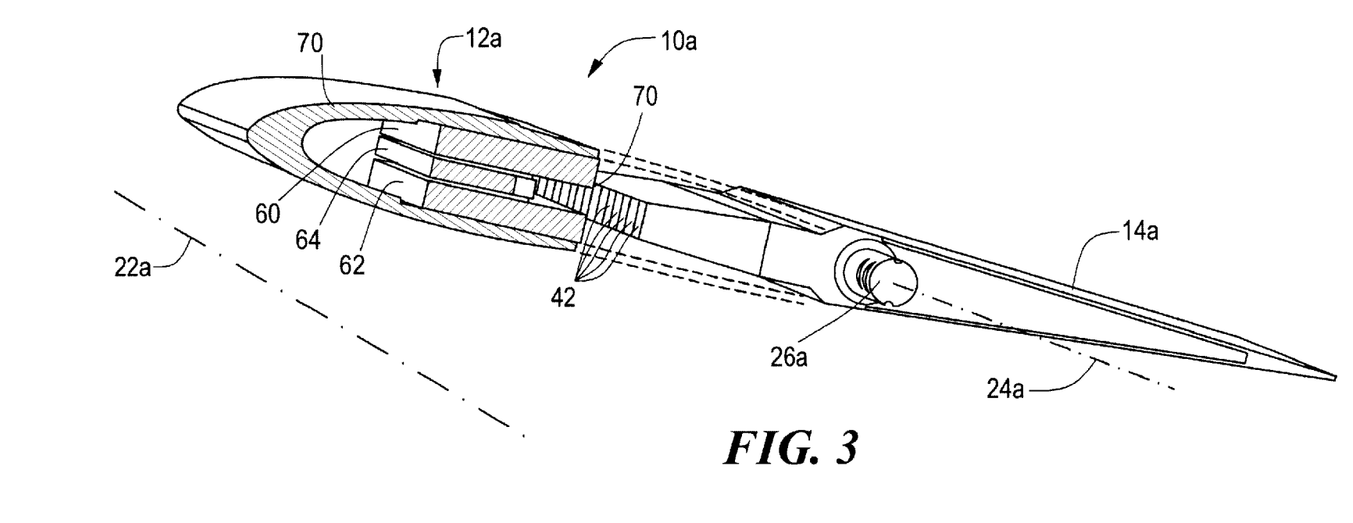
FIG. 3 is a sectional view taken along line 3—3 of FIG. 2 with the D spar piece added.

One particular construction of the flap system 12a, FIGS. 2 and 3, according to this invention includes flap member 14a mounted on bar 26a which is a torsion bar held in tension acting as the bearing member for flap 14a. Tension/torsion bar 26a is fixed to the airfoil frame 30 by means of a low stress fastener such as dowel pin apparatus 32 shown in more detail in FIG. 4.

Tension/torsion bar 26a extends all the way through flap 14a and is journaled in a bearing, not shown, at the distal end 34 of air frame structure 30. Tension/torsion bar 26a is also fastened to flap 14a by a dowel pin fastener 36 similar to dowel pin apparatus 32. In this manner, when the blade is rotating the g force, in the neighborhood of 1000 g's, developed along axis 22a by a centrifugal force puts bar 26a in tension, that is, tends to pull it away from dowel pin fastener 32. Flap 14a is fastened to bar 26a somewhere along its extent through flap 14a, in this case at the far distal end 38 of flap 14a, but the location is not a limitation on the invention as the fastening can be anywhere along the bar 26a. In this manner the tension/torsion bar 26a can easily withstand the high g forces and in fact may even be made in the form of a cable or any other design that retains its strength in tension. Tension/torsion bar 26a may also be made to exhibit a torsion bar function so that if flap 14a is moved from a nominally neutral position tension/torsion bar 26a will move it back to the nominal or rest position. This contributes to the fast response of which flap 14a is capable.

Flap 14a is axially driven by an electromagnetic motor, actually an electromagnetic motor segment, which is integral with the air frame structure 30 and flap 14a. The field circuit is made integral with either the air frame structure or the flap 14a, while the armature circuit is made integral with the other. Specifically, in FIGS. 2 and 3 the field circuit 40 is made an integral part of flap member 14a by means of one or more magnets 42 (showing their north side out) which are inserted in pockets 44 all along the edge of flap member 14a.

The armature circuit 46 is formed by one or more coil assemblies 48. A second coil assembly has been removed for ease of viewing of magnets 42. There may be many more such coils and coil assemblies. Armature coil assembly 48 includes a support core 50 having a plurality of threaded bores 52 which receive a plurality of screws through the skin or outer membrane of blade 10a to hold the core in place and prevent movement of armature assembly 48 under the influence of the centrifugal force. Depending on its polarization, when armature assembly 48 is energized in one direction it causes flap 14a to go down and in the other direction to go up and the torsion bar effect of tension/torsion bar 26a quickly restores flap 14a to its rest or neutral position.

Figure 4:
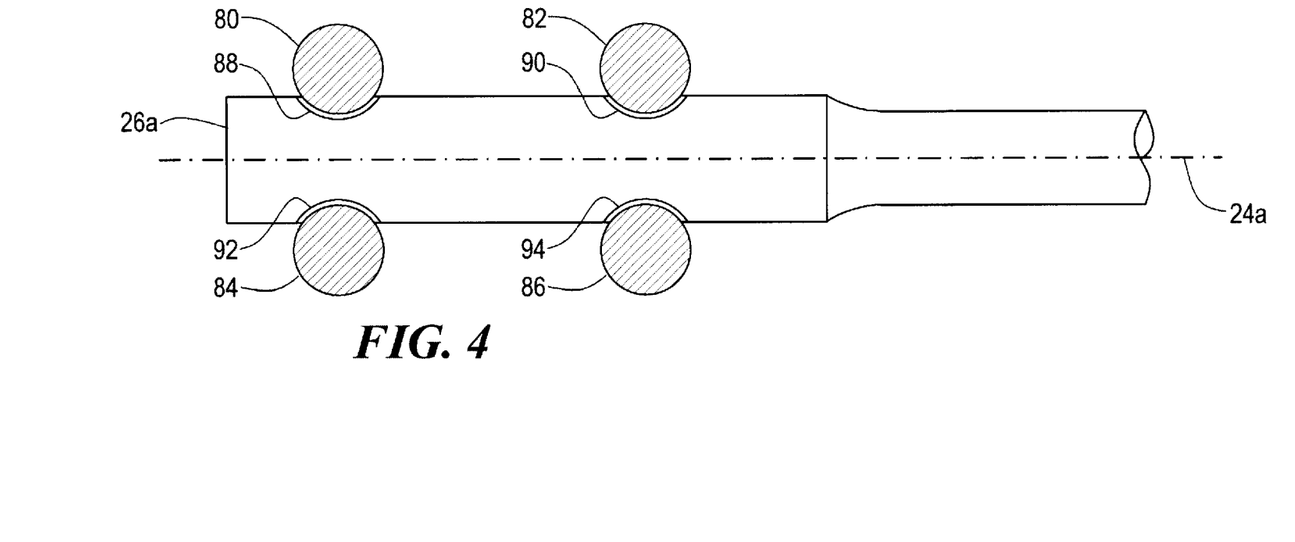
FIG. 4 is a top plan schematic diagram showing the dowel pin fasteners with the torsion bar of FIGS. 2 and 3.

The combination of armature circuit 46 and field circuit 40 form a small arcuate sector of a conventional rotary electric motor which directly drives flap member 14a with virtually no moving parts. This not only simplifies and reduces the cost of the flap actuator system, but also reduces the vulnerability of the system to the high g forces that it must undergo. Actually armature assembly 48 includes two coil segments 60 and 62 with a back iron member 64 between them as can be seen more readily in FIG. 3 which also shows the forward D spar 70 in place on the leading edge of blade 10. A small air gap 70 is provided between magnets 42 and coils 60 and 62 as is conventional in electromagnetic motors. The gap is typically on the order of approximately 50 thousandths of an inch. Dowel pin fasteners 32 and 36 may be constructed as shown in FIG. 4 where in the four dowel pins 80, 82, 84 and 86 each engage with a semi-cylindrical bore 88, 90, 92 and 94 in tension/torsion bar 26a to prevent it from longitudinal motion along its axis 24a and also prevent it from rotating in order to engender the proper torsion bar effect.

Figure 5:
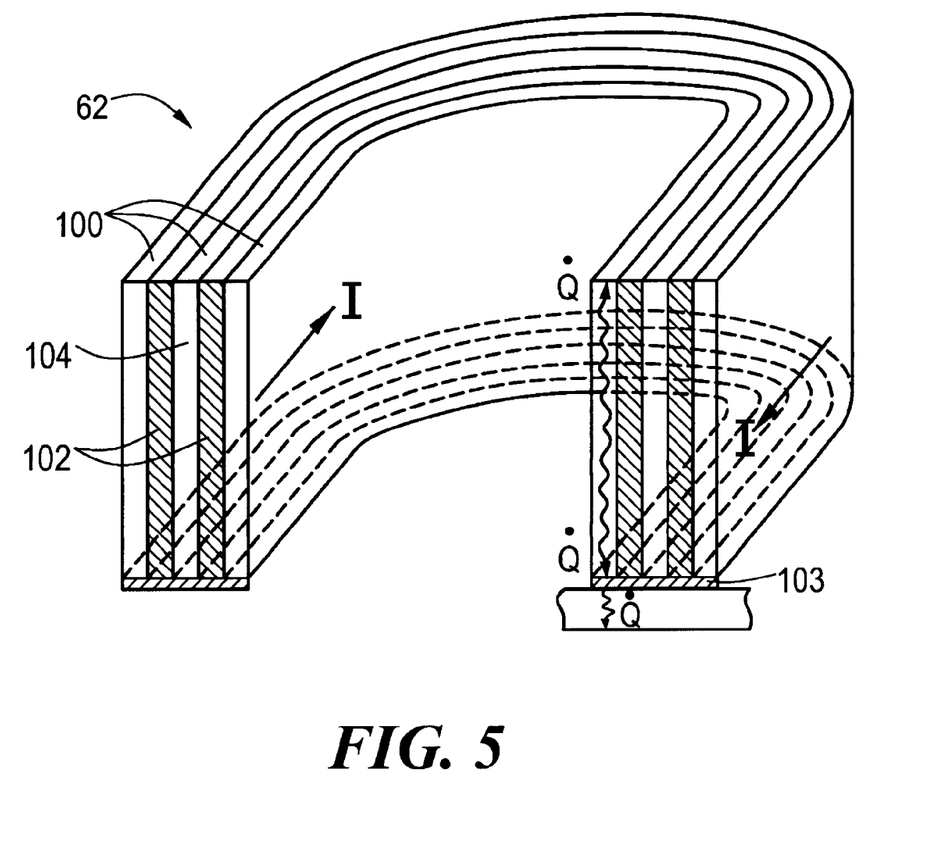
FIG. 5 is a three-dimensional sectional schematic diagram with portions broken away of the coil shown in FIGS. 2 and 3.

Each coil 62, 64 and the adjacent coils, not shown in FIGS. 2 and 3, are formed in a "race track" configuration as exemplified by coil 62, FIG. 5. Coil 62 is formed from a plurality foil layers epoxied together with an electrically insulating ribbon layer between them. In actuality there are tens or hundreds of layers but for simplicity of understanding in FIG. 5 coil 62 is shown as having only three foil ribbon layers 100 separated by two epoxy layers 102 with the electric insulating layer 104 between them. Typically after the lamination with the epoxy and electrically insulating layers the entire coil is baked and then the top and bottom surfaces are milled flat and etched chemically to eliminate shorts on the surface from the milling operation. After this the coils can be stacked one on top of another with a thin thermally conductive layer 103 between them and then can be engaged with the blade skin with another thin thermally conductive layer so that the heat travels easily up and down the ribbons to the blades where it can be dissipated without interfering with the operation of the system. This unique design using the foil ribbon in this "vertical" orientation dissipates the heat simply and effectively. Although the coils here are shown as discrete members which are individually made and then fastened together using the support core 50 and screw holes 52, FIG. 2, this is not a necessary limitation of the invention. For example, in contemporary composite blades made of carbon or glass fiber and epoxy the coils may be fabricated as an integral part of the D spar of the blade.

Figure 6A:
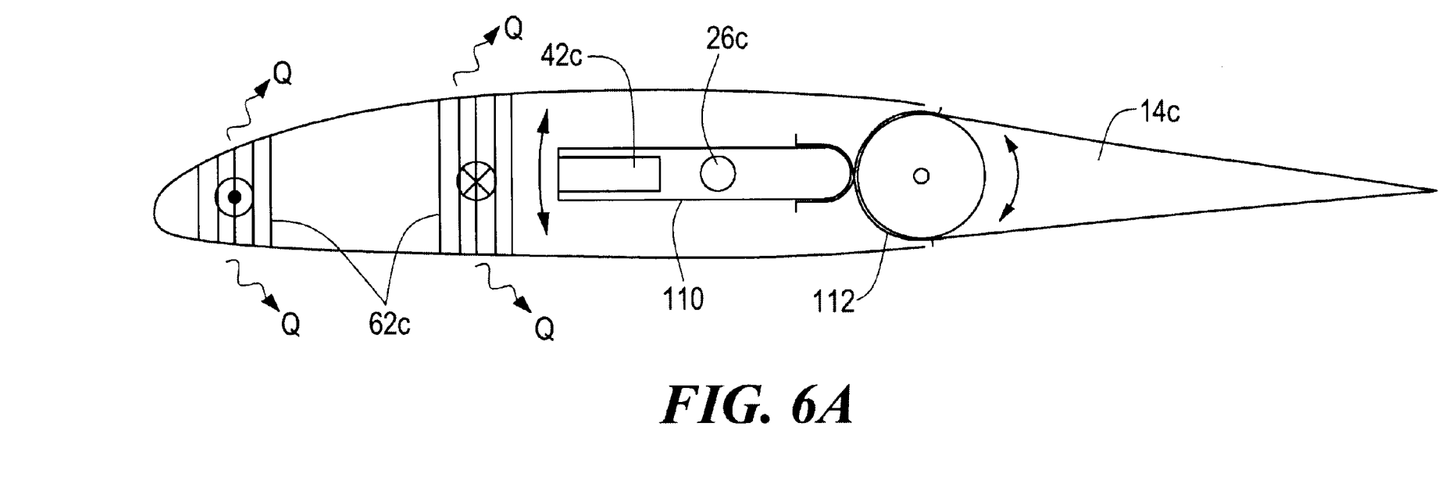
FIGS. 6A–F are side elevational schematic diagrams of another construction of the invention showing examples of different drive mechanisms that can be used intermediate between the flap member and drive motor.
Figure 6B:
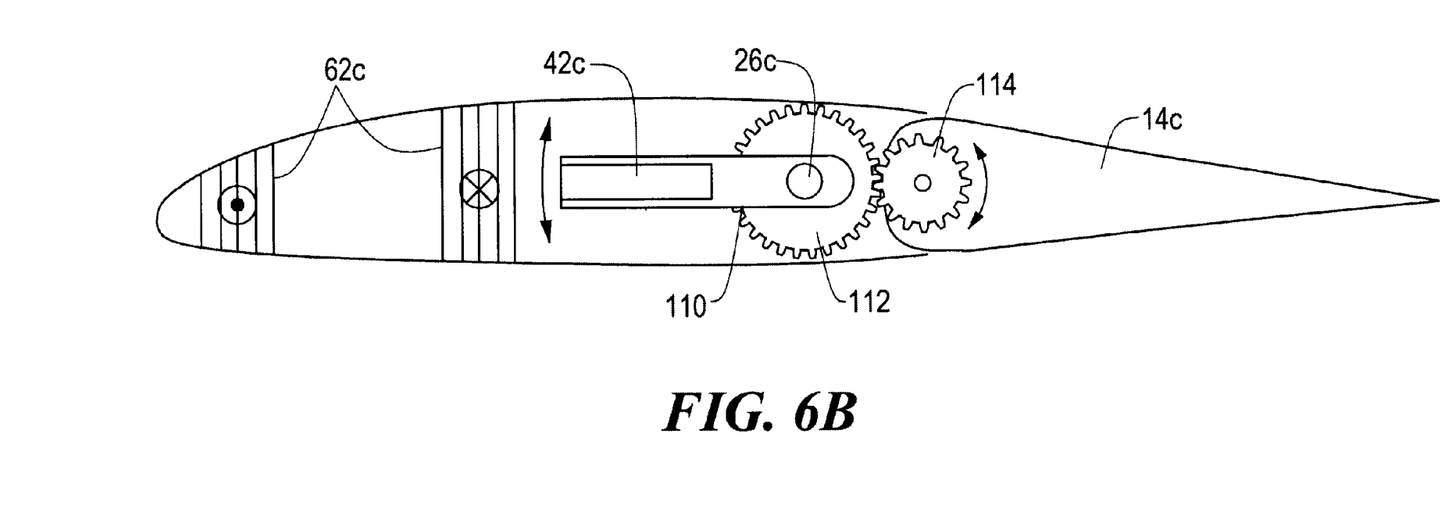
Figure 6C:
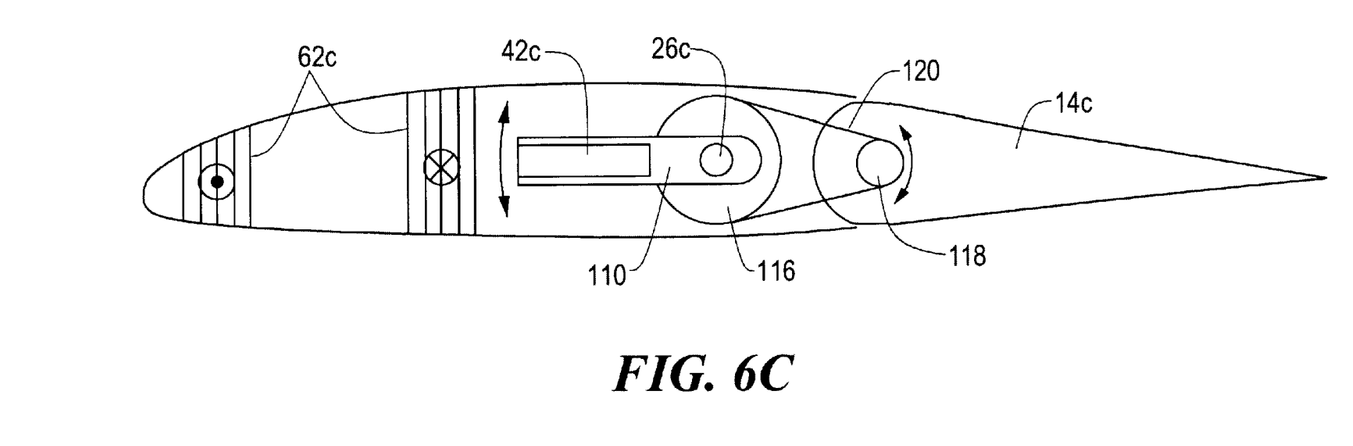
Figure 6D:
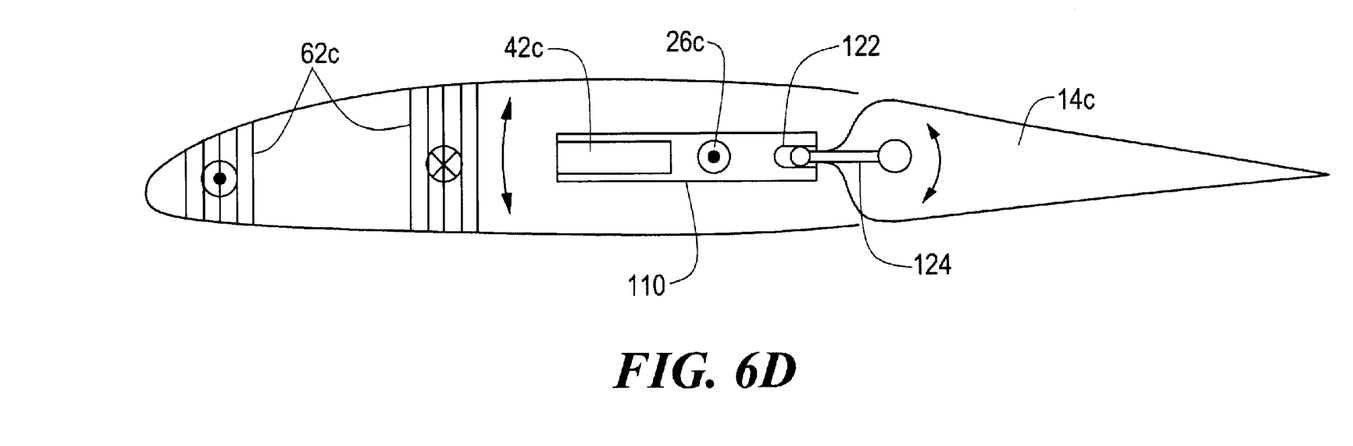
Figure 6E:
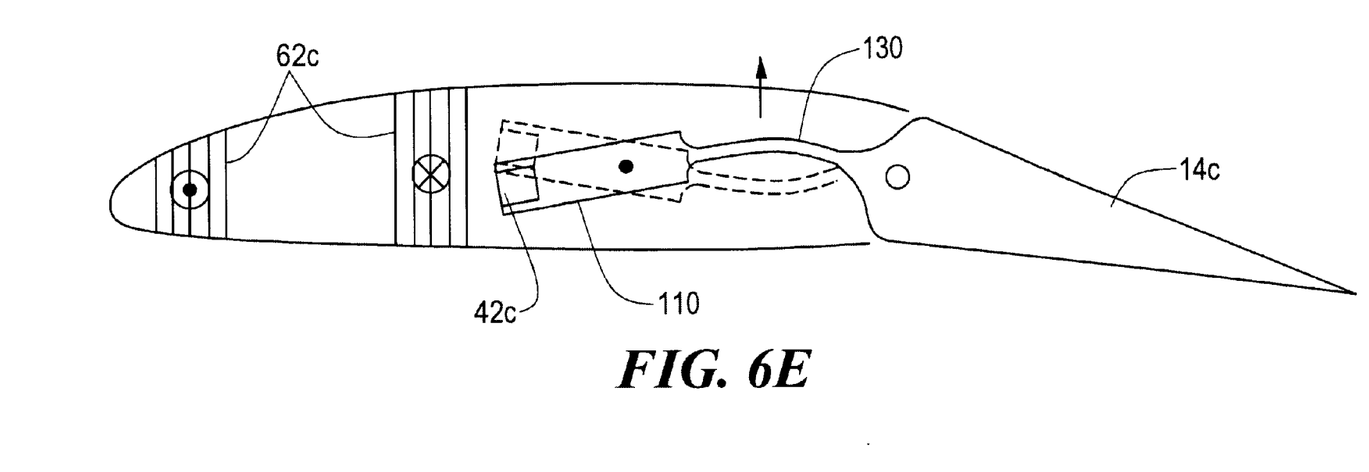
Figure 6F:
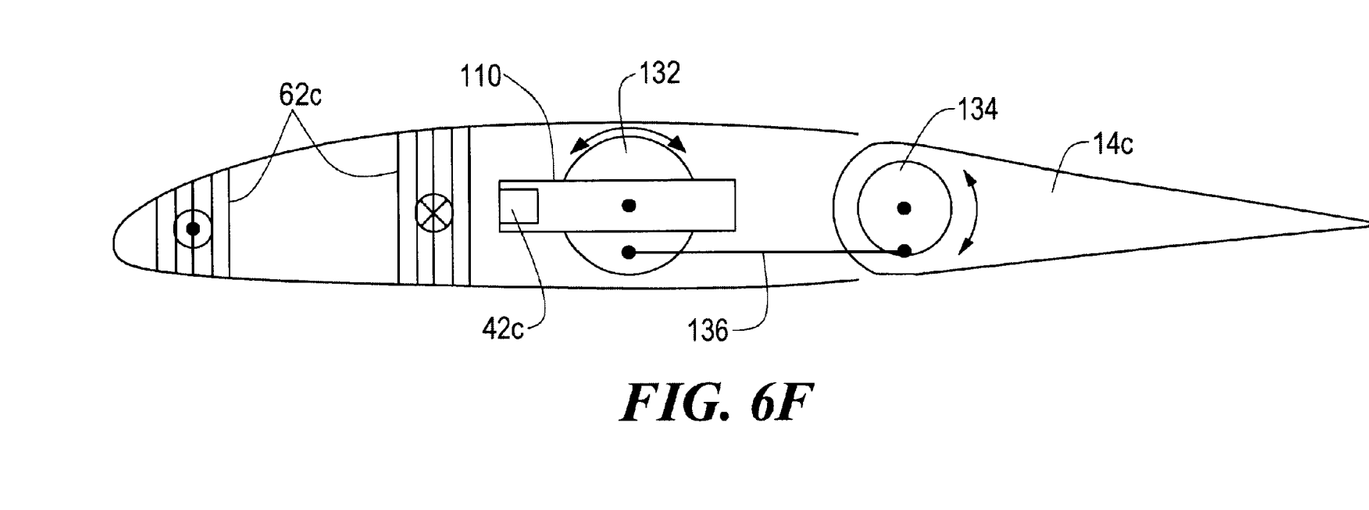

Although thus far the segment motor has been shown as integral with the air frame and the flap member, there may be an intermediate drive mechanism which is integrated with the electromagnetic motor and drives the flap member. In that case the electromagnetic motor includes the drive mechanism and the air frame and the flap member is simply driven by the drive mechanism. For example, as shown in FIG. 6A, the electromagnetic coil 62c again forms the armature while the magnets 42c are carried by magnetic frame 110 which uses a crossband mechanism 112 to operate flap member 14c. In FIG. 6B a gear 112 attached to magnetic frame 110 drives a second gear 114 mounted on flap member 14c. In FIG. 6C magnetic member 110 carries a pulley 116 which drives pulley 118 on flap member 14c by means of belt 120. In FIG. 6D magnetic member 110 includes a recess 122 in which a guide pin 124 slides to and fro to operate flap member 14c. In FIG. 6E magnetic member 110 is connected to a flexible member 130 which flexes in accordance with the movement of magnetic frame 110 to drive flap member 14c and in FIG. 6F magnetic frame member 110 mounts a wheel 132 which is attached to a companion wheel 134 by rigid link 136 to operate flap member 14c. In each of the constructions of FIGS. 6A–F as well as the other constructions there can be used different lever or pulley or gear ratios.

Figure 7:
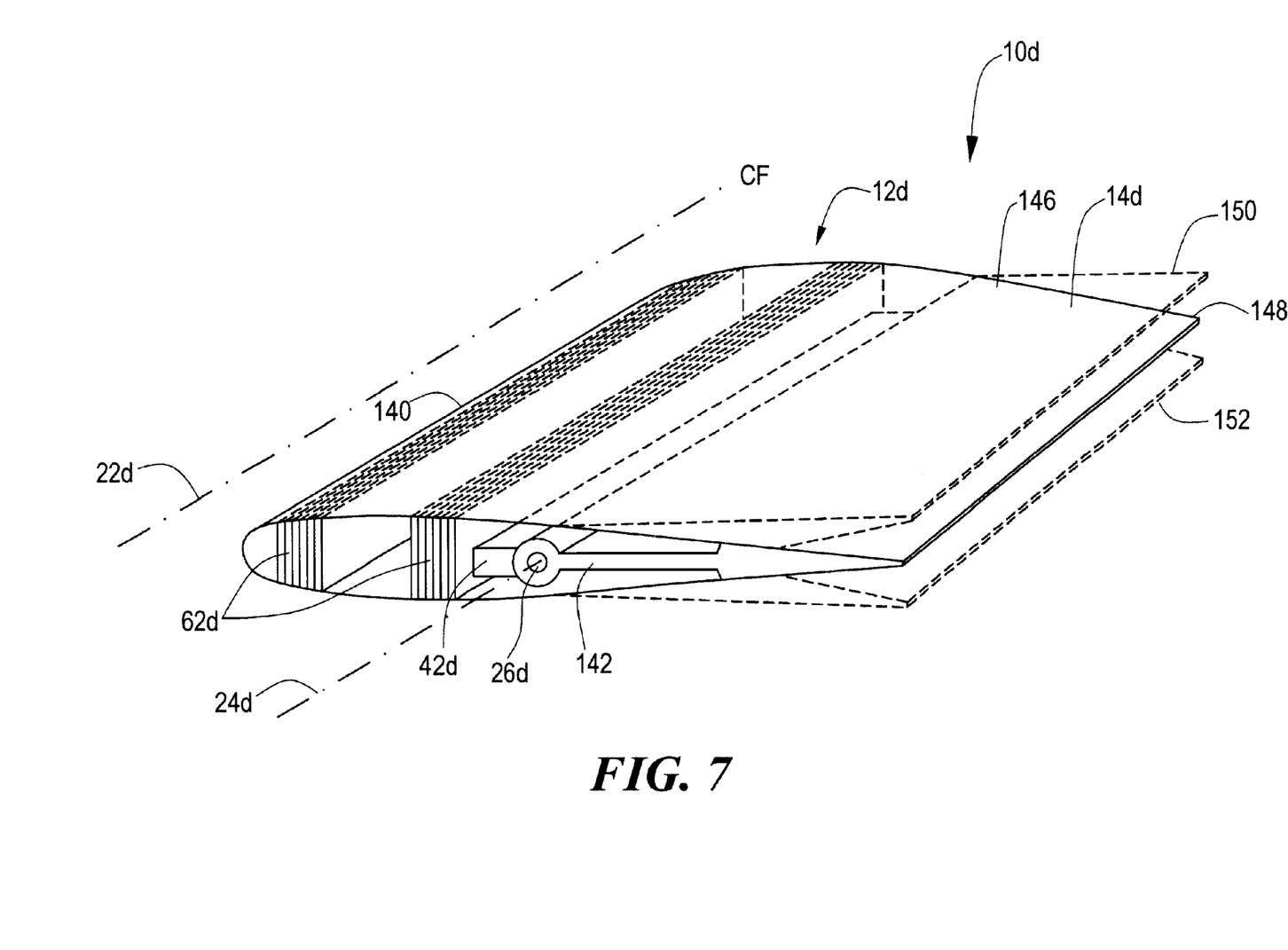
FIG. 7 is a three-dimensional diagrammatic view with portions shown in section of a flap member according to this invention which is integral with the blade.

Although thus far the flap member has been shown as an element separate and apart from the air frame structure, this is not a necessary limitation of the invention. For instead of rotating the flap member relative to the air frame structure the flap member can be made an integral part of the blade and simply be deformed as a part of that blade in order to effect the control of the aerodynamics of the blade such as improving its lift. This is shown in FIG. 7, where one or more coils represented by coil 62d is embedded in the D spar leading edge 140 of blade 10d and the magnetic frame 142 is embedded in the medium of blade 10d rotated about tension bar 26d. Then when the electromagnetic motor including coil 62d and magnets 42d is activated, magnetic frame 142 will flex the deformable skin 146 of blade 10d from the neutral position 148 to the up position 150 or down position 152 and it will be quickly restored by the operation of the tension/torsion bar 26d as in the previous configurations.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A flap actuator system and airfoil structure subject to high forces comprising:
    a flap member for controlling the airfoil structure;
    a tension member having its axis extending along the g force axis; said tension member being attached to the airfoil structure at a first point and attached to said flap member at a second point spaced from said first point in the direction of the g force axis; and
    an actuator device for rotating said flap member about the axis of said tension member relative to the airfoil structure.

2. The flap actuator system of claim 1 in which said tension member includes a tension bar.

3. The flap actuator system of claim 1 in which said tension member includes a torsion bar.

4. The flap actuator system of claim 1 in which said airfoil structure is a rotary blade.

5. The flap actuator system of claim 4 in which said rotary blade is a helicopter blade.

6. The flap actuator system of claim 4 in which said second point is at the radially outward end of said flap member.

7. The flap actuator system of claim 1 in which said tension member is attached at said first and second points with a low stress fastener device.

8. The flap actuator system of claim 7 in which each said fastener device includes a dowel pin fastener.

9. The flap actuator system of claim 1 in which said actuator device includes an electromagnetic driver.

10. The flap actuator system of claim 9 in which said actuator device includes a drive mechanism interconnecting said electromagnetic driver and said flap member.

11. The flap actuator system of claim 1 in which said flap member and airfoil structure are integral.

12. The flap actuator system of claim 1 in which said flap member and airfoil structure are made of aluminum.

13. The flap actuator system of claim 1 in which said flap member and airfoil structure are made of a composite.

14. A flap actuator system and airfoil structure comprising:
   a flap member for controlling the airfoil structure;
   a bearing member interconnected with said flap member and airfoil structure; and
   an electromagnetic motor segment integral with said flap member and airfoil structure for rotating said flap member about the axis of said bearing member relative to the airfoil structure and including a field circuit integral with one of said flap member and airfoil structure and an armature circuit integral with the other of said flap member and the airfoil structure.

15. The flap actuator system of claim 14 in which said flap member and airfoil structure are integral.

16. The flap actuator system of claim 14 in which said bearing member includes a tension bar.

17. The flap actuator system of claim 14 in which said bearing member includes a torsion bar.

18. The flap actuator system of claim 14 in which said field circuit is in said flap member and said armature circuit is in the airfoil structure.

19. The flap actuator system of claim 14 in which said field circuit includes a permanent magnet device.

20. The flap actuator system of claim 19 in which said permanent magnet device includes a plurality of permanent magnets.

21. The flap actuator system of claim 19 in which said flap member includes at least one pocket for mounting said permanent magnet device.

22. The flap actuator system of claim 14 in which said armature includes a coil circuit.

23. The flap actuator system of claim 22 in which said coil circuit includes more than one electromagnetic coil.

24. The flap actuator system of claim 22 in which each electromagnetic coil includes a ribbon winding.

25. The flap actuator system of claim 22 in which each electromagnetic coil includes a support coil.

26. The flap actuator system of claim 14 in which said flap member and airfoil structure are integral.

27. A flap actuator system and airfoil structure comprising:
   a flap member for controlling the airfoil structure;
   a bearing member interconnected with said flap member and the airfoil structure; and
   an actuator device for rotating said flap member about the bearing member relative to the airfoil structure; said actuator device including an electromagnetic motor segment and a drive mechanism driven by said electromagnetic motor to rotate said flap member about the axis of said bearing member relative to said airfoil structure; said electromagnetic motor being integral with said airfoil structure and said drive mechanism; said electromagnetic motor including a field circuit integral with one of said flap member and drive mechanism and an armature circuit integral with the other.

28. The flap actuator system of claim 27 in which said drive mechanism includes a gear device.

29. The flap actuator system of claim 27 in which said drive mechanism includes a pulley drive.

30. The flap actuator system of claim 27 in which said drive mechanism includes a cross band drive.

31. The flap actuator system of claim 27 in which said drive mechanism includes a slider drive.

32. The flap actuator system of claim 27 in which said drive mechanism includes a flex drive.

33. The flap actuator system of claim 27 in which said drive mechanism includes a rigid link.

\* \* \* \* \*